(12) United States Patent
Su et al.

(10) Patent No.: US 12,407,438 B2
(45) Date of Patent: Sep. 2, 2025

(54) SIGNAL FRAME PROCESSING METHOD AND RELATED DEVICE

(71) Applicant: Huawei Technologies Co., Ltd., Shenzhen (CN)

(72) Inventors: Wei Su, Dongguan (CN); Yujie Chen, Dongguan (CN); Liang Sun, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 349 days.

(21) Appl. No.: 17/971,066

(22) Filed: Oct. 21, 2022

(65) Prior Publication Data
US 2023/0044113 A1 Feb. 9, 2023

Related U.S. Application Data

(63) Continuation of application No. PCT/CN2021/087175, filed on Apr. 14, 2021.

(30) Foreign Application Priority Data

Apr. 22, 2020 (CN) .......................... 202010322079.5

(51) Int. Cl.
*H04J 3/16* (2006.01)
*H04Q 11/00* (2006.01)

(52) U.S. Cl.
CPC ........ *H04J 3/1652* (2013.01); *H04Q 11/0062* (2013.01)

(58) Field of Classification Search
None
See application file for complete search history.

(56) References Cited

U.S. PATENT DOCUMENTS

2004/0192204 A1* 9/2004 Periyalwar ............ H04W 52/46
455/25
2011/0285516 A1* 11/2011 Ritter .................... H04W 88/04
370/276

(Continued)

FOREIGN PATENT DOCUMENTS

CN  100481795 C  4/2009
CN  101771519 B  8/2013

(Continued)

OTHER PUBLICATIONS

Joao Santos et al., "Optimized Routing and Buffer Design for Optical Transport Networks Based on Virtual Concatenation", Journal of Optical Communications and Networking, vol. 3, No. 9, Sep. 2011, 14pages.

*Primary Examiner* — Lonnie V Sweet
(74) *Attorney, Agent, or Firm* — Slater Matsil, LLP (57) ABSTRACT

Embodiments of this application provide a signal frame processing method and a related device. A sink node performs delay compensation on a received service, so that delay variation generated in a transmission process of the service can be effectively eliminated. The method in embodiments of this application includes the following steps. First, the sink node receives a signal frame. A payload area of the signal frame is used to bear a target service, and an overhead area of the signal frame includes a node quantity field. Then, the sink node determines, based on the node quantity field, a quantity of nodes through which the target service passes during transmission. Further, the sink node performs delay compensation on the target service based on the quantity of nodes.

20 Claims, 7 Drawing Sheets

(56) References Cited

U.S. PATENT DOCUMENTS

| | | | |
|---|---|---|---|
| 2012/0099854 A1* | 4/2012 | Fourcand | H04L 43/0864 |
| | | | 370/252 |
| 2017/0208377 A1* | 7/2017 | Rajan | H04Q 11/0005 |
| 2017/0230262 A1* | 8/2017 | Sreeramoju | H04L 43/0811 |
| 2021/0007075 A1* | 1/2021 | Small | G01S 1/024 |

FOREIGN PATENT DOCUMENTS

| | | | | |
|---|---|---|---|---|
| CN | 101873517 B | 8/2013 | | |
| CN | 104426772 A | 3/2015 | | |
| WO | WO-2015109800 A1 * | 7/2015 | | H04J 14/0241 |
| WO | 2018045857 A1 | 3/2018 | | |

\* cited by examiner

SIGNAL FRAME PROCESSING METHOD AND RELATED DEVICE

CROSS-REFERENCE TO RELATED APPLICATIONS

This application is a continuation of International Application No. PCT/CN2021/087175, filed on Apr. 14, 2021, which claims priority to Chinese Patent Application No. 202010322079.5, filed on Apr. 22, 2020. The disclosures of the aforementioned applications are hereby incorporated by reference in their entireties.

TECHNICAL FIELD

This application relates to the optical communication field, and in particular, to a signal frame processing method and a related device.

BACKGROUND

As gradual expansion of an optical transport network (OTN) from main application to a metropolitan core scenario to application to a metropolitan edge and access, that the OTN is used to bear a small-granularity service is becoming a focus for discussion in the industry. Currently, the International Telecommunication Union-Telecommunication Standardization Sector (ITU-T) is discussing to implement hybrid transmission of a plurality of small-granularity services in a manner based on a flexible tributary unit. The plurality of services are separately mapped to different flexible optical service unit (OSUflex) frames, and different OSUflex frames correspond to different flexible tributary unit (TUflex) frames. Further, the OSUflex frame is mapped and multiplexed to an optical payload unit k (OPUk) frame.

Each time the OSUflex frame passes through a node, the OSUflex frame is mapped to the OPUk frame once. As a result, delay variation may be caused. In a transmission process of a service, delay variation accumulated after the service passes through a plurality of nodes is more obvious at a sink node.

SUMMARY

Embodiments of this application provide a signal frame processing method and a related device. A sink node performs delay compensation on a received service, so that delay variation generated in a transmission process of the service can be effectively eliminated.

According to a first aspect, this application provides a signal frame processing method. Signal frame transmission is performed among a source node, an intermediate node, and a sink node. Specifically, the method is performed by the sink node. The method includes a plurality of steps. First, the sink node receives a signal frame, where a payload area of the signal frame is used to bear a target service, and an overhead area of the signal frame includes a node quantity field. Then, the sink node determines, based on the node quantity field, a quantity of nodes through which the target service passes during transmission. Further, the sink node performs delay compensation on the target service based on the quantity of nodes. It should be understood that "the payload area of the signal frame is used to bear the target service" means that the node maps the target service to the payload area of the signal frame.

In this implementation, the sink node performs delay compensation on a received service, so that delay variation generated in a transmission process of the service can be effectively eliminated.

Optionally, in some possible implementations, before the sink node performs delay compensation on the target service based on the quantity of nodes, the method further includes: The sink node receives configuration information sent by a network management device, where the configuration information is used to indicate the quantity of nodes through which the target service passes during transmission. Further, the sink node may check, based on the configuration information, the quantity of nodes that is indicated by the node quantity field, so that an obtained quantity of nodes is more accurate.

Optionally, in some possible implementations, the signal frame is a flexible optical service unit (OSUflex) frame, the OSUflex frame includes an overhead subframe and a data subframe, the data subframe is used to bear the target service, and the overhead subframe includes the node quantity field. In this implementation, an implementation of including the node quantity field into the OSUflex frame is provided to improve practicality of the solution.

Optionally, in some possible implementations, the signal frame is a flexible tributary unit (TUflex) frame, and the TUflex frame includes a plurality of payload blocks, where an overhead area of at least one payload block in the plurality of payload blocks includes the node quantity field, and/or a payload area of a target payload block in the plurality of payload blocks includes the node quantity field. In this implementation, an implementation of including the node quantity field into the TUflex frame is provided to improve scalability of the solution.

Optionally, in some possible implementations, the method further includes: The sink node recovers a clock of the target service based on the quantity of nodes. Specifically, the sink node demaps data of the target service, and inputs the data of the target service and the quantity of nodes into a clock recovery circuit. The quantity of nodes is used as an input parameter of the clock recovery circuit, so that clock recovery accuracy can be further improved.

Optionally, in some possible implementations, the overhead area of the signal frame further includes a keep alive field, and the method further includes: The sink node determines, based on the keep alive field, that the target service is in an active state. Even if the sink node does not receive the target service in a time period, the sink node may provide a normal management and monitoring overhead channel and a corresponding management and monitoring capability for the target service, and may also reserve a required transmission bandwidth for the target service. In this case, when there is a target service that needs to be transmitted, the sink node does not need to re-establish a new transmission channel for the target service and re-allocate a bandwidth to the target service. This can maintain service transmission continuity, and reduce a transmission delay of the target service.

According to a second aspect, this application provides a signal frame processing method. Signal frame transmission is performed among a source node, an intermediate node, and a sink node. Specifically, the method is performed by the intermediate node.

The method includes: First, the intermediate node receives a first signal frame, where a payload area of the first signal frame is used to bear a target service, and an overhead area of the first signal frame includes a node quantity field; then, the intermediate node determines, based on the node quantity field, a quantity of nodes through which the target service passes during transmission; next, the intermediate node increases the original quantity of nodes by 1, and updates the first signal frame based on a new quantity of nodes; and further, the intermediate node sends the updated first signal frame. In this implementation, the sink node may extract the quantity of nodes from the first signal frame sent by the intermediate node. The sink node performs delay compensation on the target service based on the quantity of nodes, so that delay variation generated in a transmission process of the target service can be effectively eliminated.

Optionally, in some possible implementations, the first signal frame is an OSUflex frame, the OSUflex frame includes an overhead subframe and a data subframe, the data subframe is used to bear the target service, and the overhead subframe includes the node quantity field.

Optionally, in some possible implementations, the first signal frame is a TUflex frame, and the TUflex frame includes a plurality of payload blocks, where an overhead area of at least one payload block in the plurality of payload blocks includes the node quantity field, and/or a payload area of a target payload block in the plurality of payload blocks includes the node quantity field.

Optionally, in some possible implementations, the overhead area of the first signal frame further includes a keep alive field, and the method further includes: The intermediate node determines, based on the keep alive field, that the target service is in an active state. Even if the intermediate node does not receive the target service in a time period, the intermediate node may provide a normal management and monitoring overhead channel and a corresponding management and monitoring capability for the target service, and may also reserve a required transmission bandwidth for the target service. In this case, when there is a target service that needs to be transmitted, the intermediate node does not need to re-establish a new transmission channel for the target service and re-allocate a bandwidth to the target service. This can maintain service transmission continuity, and reduce a transmission delay of the target service.

Optionally, in some possible implementations, the method further includes: If the intermediate node does not receive the target service or a keep alive indication of the target service in a target cycle, the intermediate node generates a second signal frame, where an overhead area of the second signal frame includes a keep alive field; and further, the intermediate node sends the second signal frame, so that a downstream node can determine, based on the keep alive field, that the target service is still in an active state.

According to a third aspect, this application provides a signal frame processing method. Signal frame transmission is performed among a source node, an intermediate node, and a sink node. Specifically, the method is performed by the source node.

The method includes: First, the source node receives a target service; then, the source node maps the target service to a first signal frame, where a payload area of the first signal frame is used to bear the target service, an overhead area of the first signal frame includes a node quantity field used to indicate a quantity of nodes through which the target service passes during transmission, and the source node sets a value of the quantity of nodes to 1; and further, the source node sends the first signal frame. In this implementation, the source node adds the node quantity field into the signal frame, and sends the signal frame to a downstream node. Each intermediate node updates the node quantity field, and sends the updated signal frame. The sink node performs delay compensation on a received service, so that delay variation generated in a transmission process of the service can be effectively eliminated.

In some possible implementations, the first signal frame is an OSUflex frame, the OSUflex frame includes an overhead subframe and a data subframe, the data subframe is used to bear the target service, and the overhead subframe includes the node quantity field.

In some possible implementations, the first signal frame is a TUflex frame, and the TUflex frame includes a plurality of payload blocks, where an overhead area of at least one payload block in the plurality of payload blocks includes the node quantity field, and/or a payload area of a target payload block in the plurality of payload blocks includes the node quantity field.

In some possible implementations, the method further includes: If the source node does not receive the target service in a target cycle, the source node generates a second signal frame, where an overhead area of the second signal frame includes a keep alive field; and further, the source node sends the second signal frame, so that the downstream node can determine, based on the keep alive field, that the target service is still in an active state.

According to a fourth aspect, this application provides an optical transport system. The optical transport system includes a source node, an intermediate node, and a sink node. The source node receives a target service. Then, the source node maps the target service to a signal frame, where a payload area of the first signal frame is used to bear the target service, an overhead area of the first signal frame includes a node quantity field, the node quantity field is used to indicate a quantity of nodes through which the target service passes during transmission, and the source node sets a value of the quantity of nodes to 1. The source node sends the signal frame to a downstream node.

The intermediate node receives the signal frame sent by the source node. Then, the intermediate node determines, based on the node quantity field, the quantity of nodes through which the target service passes during transmission. Next, the intermediate node increases the original quantity of nodes by 1, and updates the signal frame based on a new quantity of nodes. Further, the intermediate node sends the updated signal frame to a downstream node.

The sink node receives the signal frame sent by the intermediate node. Then, the sink node determines the quantity of nodes on a transmission path of the service based on the node quantity field in the signal frame. Further, the sink node performs delay compensation on the target service based on the quantity of nodes. In this way, delay variation generated in a transmission process of the service can be effectively eliminated.

According to a fifth aspect, this application provides an optical transport system. The optical transport system includes a source node, an intermediate node, and a sink node. If the source node does not receive a target service in a target cycle, the source node generates a signal frame, where an overhead area of the signal frame includes a keep alive field. Then, the source node sends the signal frame to a downstream node. The intermediate node determines, based on the keep alive field in the signal frame, that the target service is in an active state. Further, the intermediate node sends the signal frame to a downstream node. The sink node determines, based on the keep alive field in the signal frame, that the target service is in an active state.

In this implementation, if there is no service traffic in a time period, the source node sets the keep alive field in the signal frame, and sends the signal frame to the downstream node. The downstream node may provide a normal management and monitoring overhead channel and a corresponding management and monitoring capability for the service, and may also reserve a required transmission bandwidth for the service. In this case, when there is a service that needs to be transmitted, the downstream node does not need to re-establish a new transmission channel for the service and re-allocate a bandwidth to the service. This can maintain service transmission continuity, and reduce a transmission delay of the service.

According to a sixth aspect, an embodiment of this application provides an optical transport device. The optical transport device includes: a processor, a memory, and an optical transceiver. The processor, the memory, and the optical transceiver are connected to each other by using a line. The processor invokes program code in the memory to perform the signal frame processing method in any one of the implementations of the first aspect to the third aspect.

According to a seventh aspect, an embodiment of the present invention provides a digital processing chip. The digital processing chip includes a processor and a memory. The memory and the processor are connected to each other by using a line. The memory stores instructions. The processor is configured to perform the signal frame processing method in any one of the implementations of the first aspect to the third aspect.

DETAILED DESCRIPTION OF ILLUSTRATIVE EMBODIMENTS

Embodiments of this application provide a signal frame processing method and a related device. A sink node performs delay compensation on a received service, so that delay variation generated in a transmission process of the service can be effectively eliminated. It should be noted that terms such as "first" and "second" in the specification, claims, and accompanying drawings of this application are used to distinguish between similar objects, and do not used to limit a specific order or sequence. It should be understood that the term is interchangeable in proper circumstances, so that embodiments described in this application can be implemented in an order other than the order described in this application. In addition, the terms "including" or any other variant thereof, are intended to cover a non-exclusive inclusion. For example, a process, a method, a system, a product, or a device that includes a series of steps or units is not necessarily limited to those expressly listed steps or units, but may include other steps or unis not expressly listed or inherent to the process, the method, the product, or the device.

Embodiments of this application are applicable to an optical network, for example, an optical transport network (OTN). One optical network generally includes a plurality of devices connected by using an optical fiber, and different topology types such as a linear topology, a ring topology, or a mesh topology may be formed based on a specific requirement.

Figure 1:
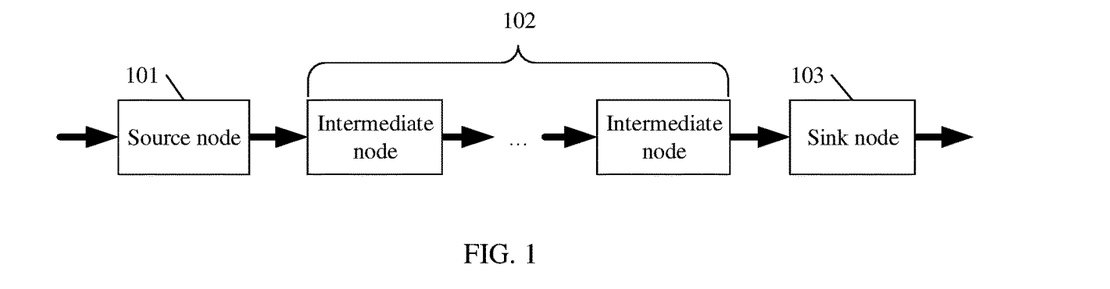
FIG. 1 is a schematic diagram of a structure of an optical transport system to which an embodiment of this application is applied.

FIG. 1 is a schematic diagram of a structure of an optical transport system to which an embodiment of this application is applied. The optical transport system shown in FIG. 1 includes a source node 101, at least one intermediate node 102, and a sink node 103. The source node 101 maps a received client service to a signal frame, and sends the signal frame to the intermediate node 102. Each intermediate node 102 transparently transmits the signal frame to the sink node 103. The signal frame in this application may be specifically referred to as a data frame, an OTN frame, or the like. This is not limited in this application. It should be understood that the source node 101, the intermediate node 102, and the sink node 103 in this application are specifically OTN devices on a transmission path of the client service. For ease of description, the following uses "source node", "intermediate node", or "sink node" to represent different devices on the transmission path of the service.

It should be noted that, in some possible optical transport systems, there may be no intermediate node 102. The source node 101 directly sends the signal frame to the sink node 103.

Figure 2:
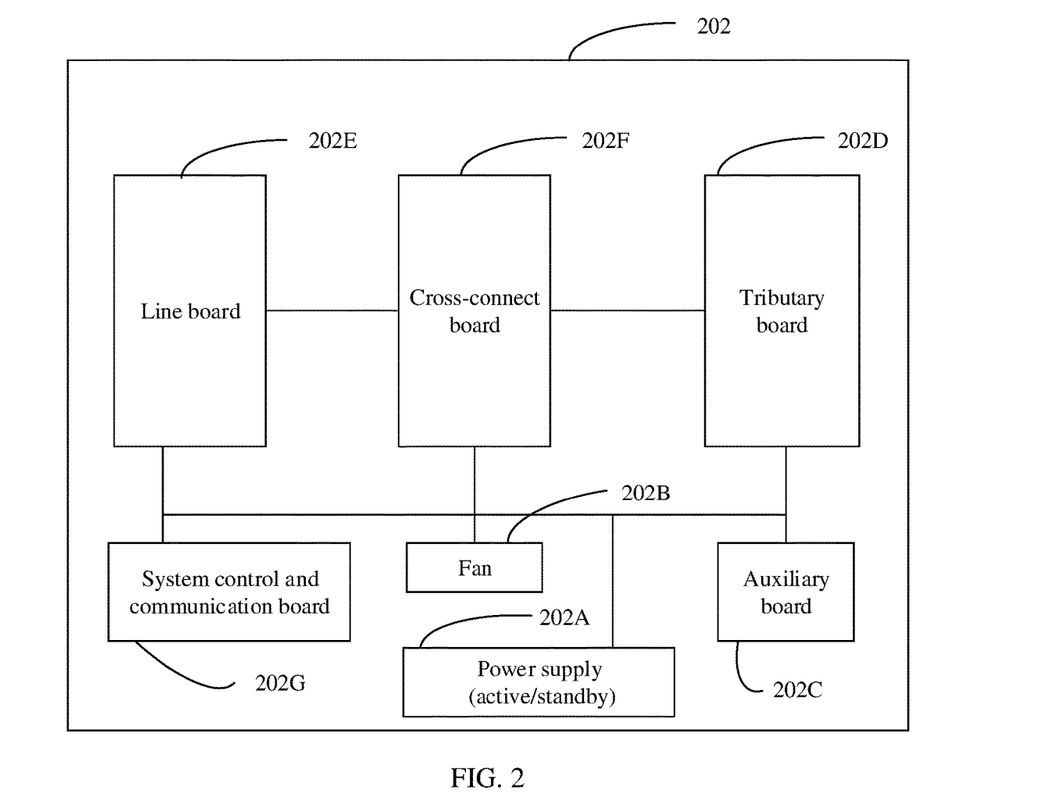
FIG. 2 is a schematic diagram of a hardware structure of an OTN device.

FIG. 2 is a schematic diagram of a hardware structure of an OTN device. Specifically, a device 202 includes a power supply 202A, a fan 202B, and an auxiliary board 202C, and may further include a tributary board 202D, a line board 202E, a cross-connect board 202F, an optical processing board (not shown in the figure), and a system control and communication board 202G. It should be noted that one device 202 may specifically include different board types and different quantities of boards based on a specific requirement. For example, a network device used as a core node may have no tributary board 202D. A network device used as an edge node may have a plurality of tributary boards 202D. The power supply 202A is configured to supply power to the device, and may include a primary power supply and a secondary power supply. The fan 202B is configured to dissipate heat for the device. The auxiliary board 202C is configured to provide an auxiliary function, for example, provide an external alarm or access an external clock. The tributary board 202D, the cross-connect board 202F, and the line board 202E are mainly configured to process an electrical signal (for example, an OSUflex frame in an OTN) in an optical network. The tributary board 202D is configured to receive and send various client services, for example, a synchronous digital hierarchy (SDH) service, a packet service, an Ethernet service, and a forward service. Further, the tributary board 202D may be divided into an optical module on a client side and a processor. The optical module on the client side may be an optical transceiver, and is configured to receive and/or send a client signal. The processor is configured to: map the client signal to the OSUflex frame, and demap the client signal from the OSUflex frame. The cross-connect board 202F is configured to exchange the OSUflex frame, to exchange one or more types of OSUflex frames. The line board 202E mainly processes an OSUflex frame on a line side. Specifically, the line board 202E may be divided into an optical module on the line side and a processor. The optical module on the line side may be an optical transceiver on the line side, and is configured to receive and/or send the OSUflex frame. The processor is configured to: multiplex and demultiplex or map and demap the OSUflex frame on the line side. The system control and communication board 202G is configured to implement system control and communication. Specifically, the system control and communication board may collect information from different boards by using a backplane or send a control instruction to a corresponding board. It should be noted that, unless otherwise specified, there may be one or more specific components (for example, a processor). This is not limited in this application. It should be further noted that, a type of a board included in the device, a specific function design of the board, and a quantity of boards are not limited in this embodiment of this application. It should be noted that the signal frame processing method in this application may be specifically implemented on the line board 202E, or the tributary board 202D and the line board 202E may be integrated to implement the signal frame processing method in this application.

The following describes several possible signal frames in this application with reference to the accompanying drawings.

Figure 3:
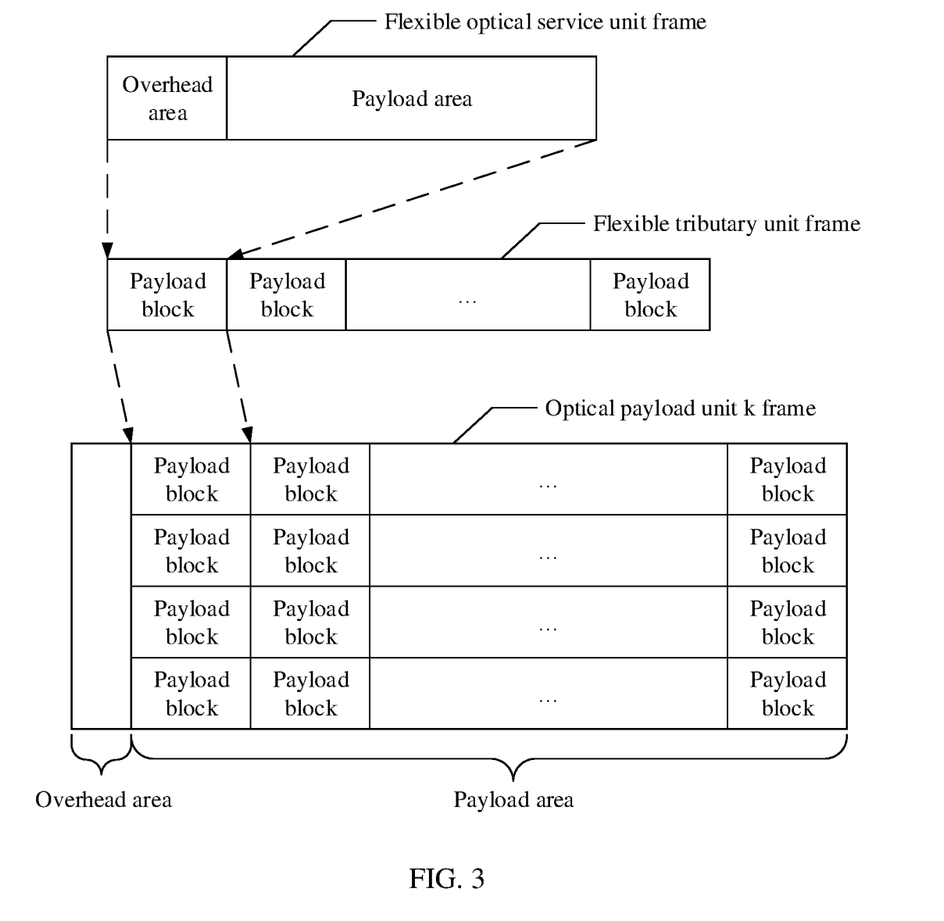
FIG. 3 is a schematic diagram of several possible structures of a signal frame according to this application.

FIG. 3 is a schematic diagram of several possible structures of a signal frame according to this application. As shown in FIG. 3, the signal frame may be specifically a flexible optical service unit (OSUflex) frame, a flexible tributary unit (TUflex) frame, or an optical payload unit k (OPUk) frame. The OSUflex frame includes an overhead area and a payload area, and the payload area is used to bear a client service. The OSUflex frame is used to be mapped to the TUflex frame, the TUflex frame includes a plurality of payload blocks (PB), and each OSUflex frame has a corresponding payload block. In addition, each payload block includes a tributary port number (TPN) used to indicate a number of a service borne in a current payload block. A payload area of the OPUk frame is divided into a plurality of payload blocks. The payload block in the TUflex frame may be mapped to the payload area of the OPUk frame. It should be understood that the foregoing "flexible optical service unit frame" may be named in another manner. For example, the flexible optical service unit frame may be referred to as a flexible optical service data unit (OSDUflex) frame. This is not specifically limited herein.

It should be noted that, in addition to the listed several frame types, the signal frame in this application may be an optical data unit k (ODUk) frame, an optical transport unit k (OTUk) frame, or the like. This is not specifically limited herein.

In a transmission process of a service, each time the service passes through a node, delay variation may be generated, and delay variation accumulated after the service passes through a plurality of nodes is more obvious at a sink node. Therefore, this application provides a signal frame processing method. The sink node performs delay compensation on a received service, so that delay variation generated in a transmission process of the service can be effectively eliminated.

Figure 4:
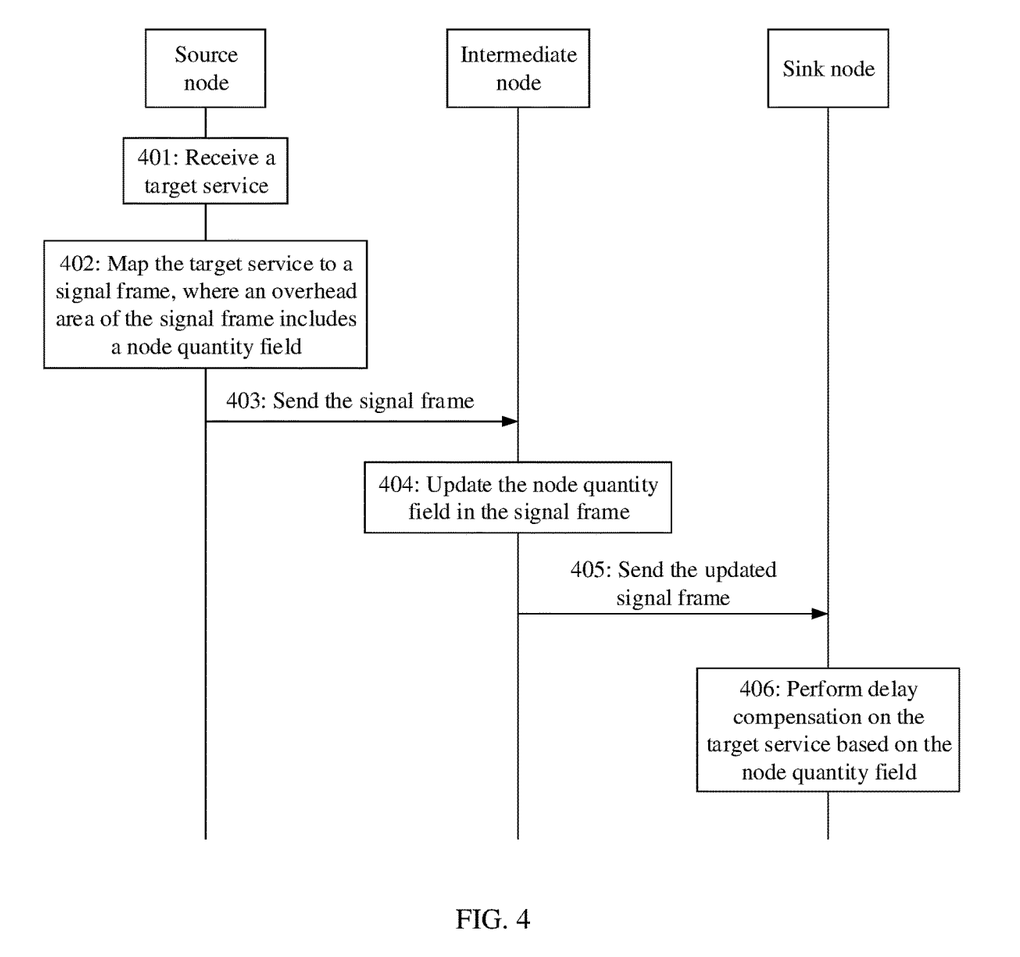
FIG. 4 is a schematic diagram of a first embodiment of a signal frame processing method according to this application.

FIG. 4 is a schematic diagram of a first embodiment of a signal frame processing method according to this application. In this example, the signal frame processing method includes the following steps.

401: A source node receives a target service.

402: The source node maps the target service to a signal frame.

Specifically, the source node maps the target service to a payload area of the signal frame, and adds a node quantity field into the signal frame. The node quantity field may be located in an overhead area of the signal frame, or may be located in the payload area of the signal frame. The node quantity field is used to indicate a quantity of nodes through which the target service passes during transmission. It should be understood that the source node sets an initial value of the quantity of nodes to 1.

It should be noted that a frame mapping manner used by each node in this embodiment may be a bit-synchronous mapping procedure (BMP), a generic mapping procedure (GMP), an idle mapping procedure (IMP), a generic framing procedure (GFP), or the like. This is not specifically limited herein.

It should be understood that, in actual application, the foregoing "node quantity field" may be named in another manner. For example, the node quantity field may be named an "accumulated node quantity field", a "node hop quantity field", or the like. This is not specifically limited herein.

403: The source node sends the signal frame to an intermediate node.

In some possible implementations, that the signal frame is an OSUflex frame is used as an example, and the source node maps the OSUflex frame to a payload block of an OPUk frame. Further, the OPUk frame is mapped to a higher-rate container such as an OTUk frame or a flexible optical transport network (FlexO) frame for sending.

404: The intermediate node updates the node quantity field in the signal frame.

After receiving the signal frame, the intermediate node determines the value of the quantity of nodes by identifying the node quantity field in the signal frame. Next, the intermediate node increases the value by 1 to obtain a new value. Further, the intermediate node updates the new value to the node quantity field. It should be understood that a transmission path of the target service generally includes a plurality of intermediate nodes. Each intermediate node increases a current quantity of nodes by 1, and updates the node quantity field.

In another possible implementation, a network management device obtains the quantity of nodes through which the target service passes on a transmission path, and delivers the quantity of nodes to the source node as configuration information. The source node indicates the quantity of nodes by adding the node quantity field into the signal frame. Each intermediate node does not need to update the quantity of nodes, to transparently transmit, to a sink node, the signal frame sent by the source node.

405: The intermediate node sends the updated signal frame to the sink node.

A sending manner of the signal frame is similar to the descriptions in step 403. Details are not described herein again.

406: The sink node performs delay compensation on the target service based on the node quantity field.

After receiving the signal frame, the sink node may determine, based on the node quantity field in the signal frame, the quantity of nodes through which the target service passes during transmission. Further, the sink node reserves a specific buffer based on the quantity of nodes to store the received signal frame, so as to subsequently send the signal frame at a same time interval to perform delay compensation on the target service. For example, each time the signal frame passes through a node, delay variation corresponding to a payload block deviation is introduced in an extreme case. An example in which a size of one payload block is 128 bytes is used for calculation. The sink node needs to reserve a buffer of N (which is the quantity of nodes)*128 bytes for delay compensation.

Optionally, the sink node may further recover a clock of the target service based on the quantity of nodes. For example, a phase-locked loop (PLL) circuit is used for clock recovery. The sink node demaps data of the target service, and inputs the data of the target service and the quantity of nodes into the PLL circuit. The quantity of nodes is used as an input parameter of the PLL circuit, so that clock recovery accuracy can be further improved.

It should be noted that, in addition to the manner described above, the sink node may obtain, in another manner, the quantity of nodes through which the target service passes in the transmission process. In a possible implementation, the network management device obtains the quantity of nodes through which the target service passes on the transmission path, and delivers the quantity of nodes to the sink node as the configuration information. Optionally, the sink node may check, by using the quantity of nodes that is delivered by the network management device, the foregoing quantity of nodes that is updated hop by hop, so that an obtained quantity of nodes is more accurate.

It may be learned from the foregoing description that, the source node adds the node quantity field into the signal frame, and sends the signal frame to a downstream node. Each intermediate node updates the node quantity field, and sends the updated signal frame. The sink node performs delay compensation on a received service, so that delay variation generated in a transmission process of the service can be effectively eliminated.

It should be noted that a maximum guaranteed bandwidth generally needs to be provided for a packet service. If there is no service traffic in a time period, each node on a transmission path of the service may determine that the service is in an inactive state, and therefore reserves no bandwidth for the service. To avoid the case, this application further provides a signal frame processing method. A keep alive field is set in the signal frame to notify the downstream node that the target service is still in an active state. The following is described in detail.

Figure 5:
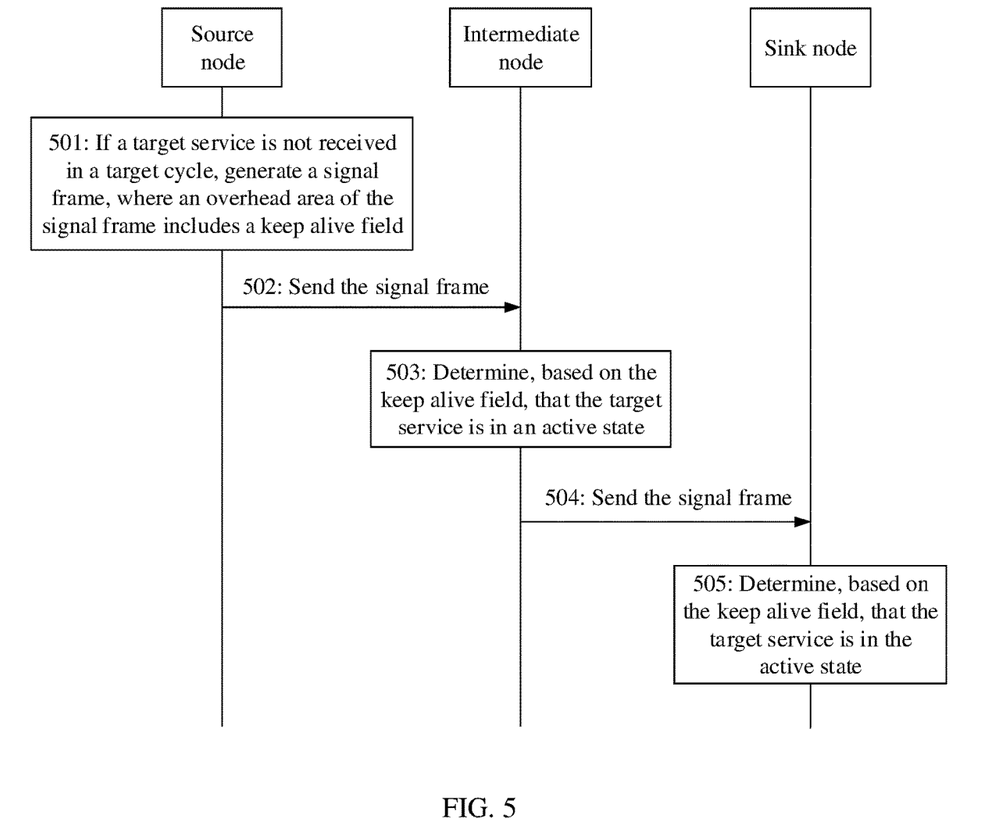
FIG. 5 is a schematic diagram of a second embodiment of a signal frame processing method according to this application.

FIG. 5 is a schematic diagram of a second embodiment of a signal frame processing method according to this application. In this example, the signal frame processing method includes the following steps.

501: If a source node does not receive a target service in a target cycle, the source node generates a signal frame.

Specifically, the signal frame includes a keep alive field. The keep alive field may be located in an overhead area of the signal frame, or may be located in a payload area of the signal frame. The keep alive field is used to indicate that the target service is in an active state. It should be understood that the payload area of the signal frame does not bear the target service. In addition, specific duration of the target cycle is not limited in this application.

Optionally, the keep alive field may be a field newly added into the signal frame. For example, the keep alive field is added into the overhead area of the signal frame. Alternatively, the keep alive field and another field in the signal frame may be a same field. For example, when a bit in the overhead area of the signal frame is a specific value, the field represents the keep alive field. Otherwise, the field represents another overhead field.

It should be understood that, in actual application, the foregoing "keep alive field" may be named in another manner. For example, the keep alive field may be named an "active indication field", an "online indication field", an "availability indication field", an "enabling indication field", or the like. This is not specifically limited herein.

502: The source node sends the signal frame to an intermediate node.

A sending manner of the signal frame is similar to the descriptions in step 403 in the embodiment shown in FIG. 4. Details are not described herein again.

503: The intermediate node determines, based on the keep alive field, that the target service keeps active.

After receiving the signal frame, the intermediate node determines, by identifying the keep alive field in the signal frame, that the target service is still in an active state. In some possible implementations, the intermediate node further reserves a required transmission bandwidth for the target service. In this case, when there is a target service that needs to be transmitted, the intermediate node does not need to re-allocate a bandwidth for the target service. This maintains service transmission continuity, and reduces a transmission delay of the target service.

504: The intermediate node sends the signal frame to a sink node.

A sending manner of the signal frame is similar to the descriptions in step 403 in the embodiment shown in FIG. 4. Details are not described herein again.

505: The sink node determines, based on the keep alive field, that the target service keeps active.

The sink node determines, by identifying the keep alive field in the signal frame, that the target service is still in an active state. In some possible implementations, the sink node further reserves a required transmission bandwidth for the target service.

It should be noted that the overhead area of the signal frame in this embodiment may still bear management and monitoring information of the target service. The intermediate node and the sink node may continue to maintain normal transmission of the management and monitoring information.

Figure 6:
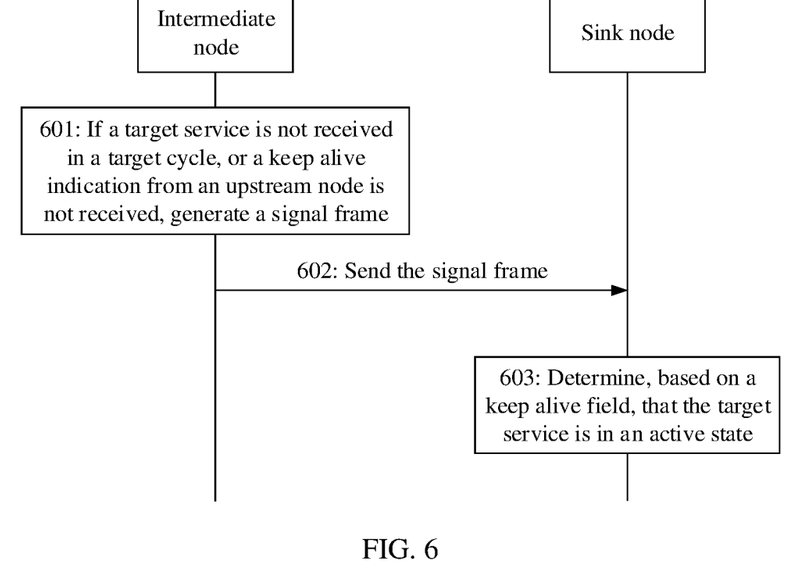
FIG. 6 is a schematic diagram of a third embodiment of a signal frame processing method according to this application.

In some possible implementations, the intermediate node may also generate a signal frame that includes a keep alive field, and send the signal frame to a downstream node. FIG. 6 is a schematic diagram of a third embodiment of a signal frame processing method according to this application. In this example, the signal frame processing method includes the following steps.

601: If an intermediate node does not receive a target service in a target cycle or does not receive a keep alive indication from an upstream node, the intermediate node generates a signal frame.

The signal frame is similar to the signal frame described in step 501 in the embodiment shown in FIG. 5. Details are not described herein again.

602: The intermediate node sends the signal frame to a sink node.

603: The sink node determines, based on a keep alive field, that the target service keeps active.

Steps 602 and 603 are similar to steps 504 and 505 in the embodiment shown in FIG. 5. Details are not described herein again. It may be learned from the foregoing description that, if there is no service traffic in a time period, the source node or the intermediate node sets the keep alive field in the signal frame, and sends the signal frame to the downstream node. The downstream node may provide a normal management and monitoring overhead channel and a corresponding management and monitoring capability for the service, and may also reserve a required transmission bandwidth for the service. In this case, when there is a service that needs to be transmitted, the downstream node does not need to re-establish a new transmission channel for the service and re-allocate a bandwidth to the service. This can maintain service transmission continuity, and reduce a transmission delay of the service.

In some possible implementations, a signal frame generated by the source node includes a node quantity field and a keep alive field. The signal frame may bear a target service, or may not bear a target service. The intermediate node and the sink node may determine, based on a type of the signal frame, whether the signal frame bears a target service. For example, a data frame bears a target service. An operation, administration and maintenance (OAM) frame does not bear a target service. For a signal frame that bears a target service, the intermediate node and the sink node may identify only the node quantity field. For a signal frame that does not bear a target service, the intermediate node and the sink node may identify only the keep alive field. The following separately describes the two cases.

In a first embodiment, the source node maps a received target service to a signal frame. The signal frame includes a node quantity field and a keep alive field. After receiving the signal frame sent by the source node, the intermediate node determines that the signal frame bears a target service. Further, the intermediate node updates the node quantity field. A specific manner is similar to step 404 in the embodiment shown in FIG. 4. Details are not described herein again. After receiving the signal frame sent by the intermediate node, the sink node determines that the signal frame bears a target service. Further, the sink node performs delay compensation on the target service based on the node quantity field. A specific manner is similar to step 406 in the embodiment shown in FIG. 4. Details are not described herein again.

In a second embodiment, if the source node does not receive a target service in a target cycle, the source node generates a signal frame that does not bear a target service. The signal frame includes a node quantity field and a keep alive field. After receiving the signal frame sent by the source node, the intermediate node determines that the signal frame does not bear a target service. Further, the intermediate node determines, based on the keep alive field, that the target service is still in an active state. After receiving the signal frame sent by the intermediate node, the sink node determines that the signal frame does not bear a target service. Further, the sink node determines, based on the keep alive field, that the target service is still in an active state.

Based on different structures of the signal frame, the following describes a manner in which the signal frame carries the node quantity field and the keep alive field.

Type 1: The signal frame is an OSUflex frame. There are specifically the following two implementations for different structures of the OSUflex frame.

Figure 7:
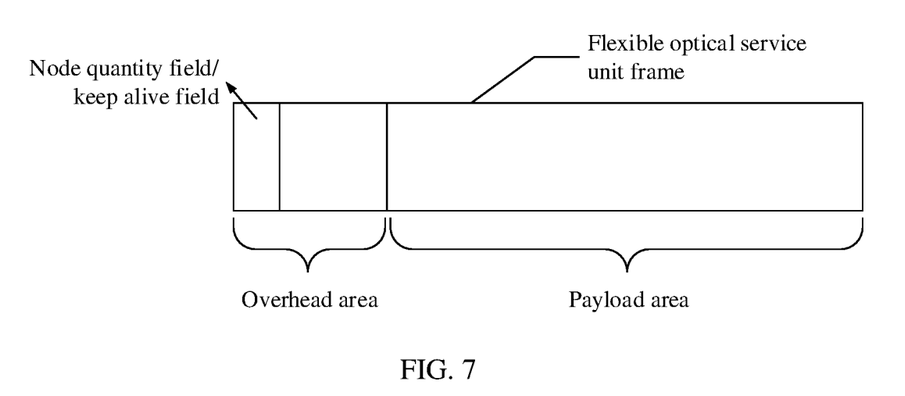
FIG. 7 is a schematic diagram of a first structure of an OSUflex frame.

Manner 1: FIG. 7 is a schematic diagram of a first structure of an OSUflex frame. The OSUflex frame includes a payload area and an overhead area. The payload area is used to bear service data. A part of bits in the overhead area may be allocated as a node quantity field and/or a keep alive field.

Optionally, the node quantity field may be defined in a multiframe indication manner. For example, only 1 bit in the overhead area of the OSUflex frame is allocated as the node quantity field. A multiframe obtained by combining a plurality of OSUflex frames includes a plurality of bits, and the plurality of bits are jointly used as the node quantity field. Alternatively, a part of bits only in an overhead area of an OSUflex frame in a multiframe are allocated as the node quantity field. An overhead area of another OSUflex frame in the multiframe is used to define another function.

Optionally, the keep alive field and another overhead field in the overhead area may be a same field. When a bit in the overhead area is a specific value, the field represents the keep alive field. Otherwise, the field represents another overhead field. For example, when all bits in the overhead area are "0" or "1", the field represents the keep alive field. For another example, when bits in the overhead area are arranged in a specific manner such as "0101" or "1010", the field represents the keep alive field.

Figure 8:
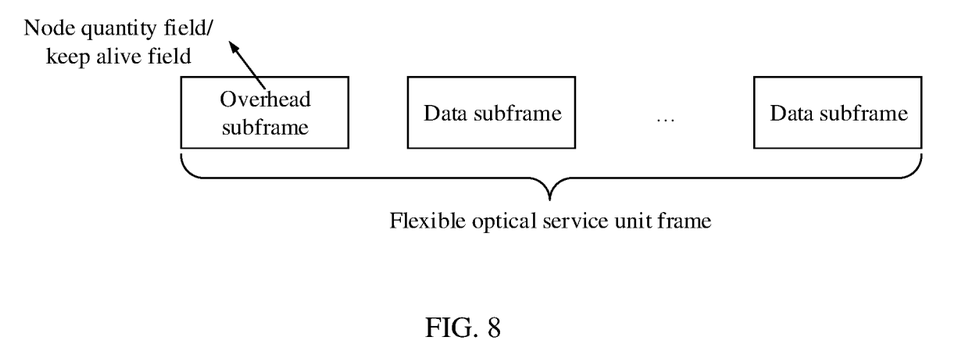
FIG. 8 is a schematic diagram of a second structure of an OSUflex frame.

Manner 2: FIG. 8 is a schematic diagram of a second structure of an OSUflex frame. The OSUflex frame includes a plurality of consecutive subframes. The plurality of consecutive subframes include an overhead subframe and a data subframe. The data subframe is used to bear service data. A part of bits in the overhead subframe may be allocated as a node quantity field and/or a keep alive field. It should be understood that a quantity of subframes in the OSUflex frame and a size of each subframe are not limited in this application. The "overhead subframe" and the "data subframe" may be named in another manner. For example, the overhead subframe and the data subframe may be named an "overhead block", a "data block", and the like. This is not specifically limited herein.

Optionally, in this implementation, the node quantity field may be defined in a multiframe indication manner. The keep alive field and another overhead field in the overhead subframe may be a same field. For a specific manner, refer to related descriptions in the foregoing Manner 1. Details are not described herein again.

Type 2: The signal frame is a TUflex frame.

Figure 9:
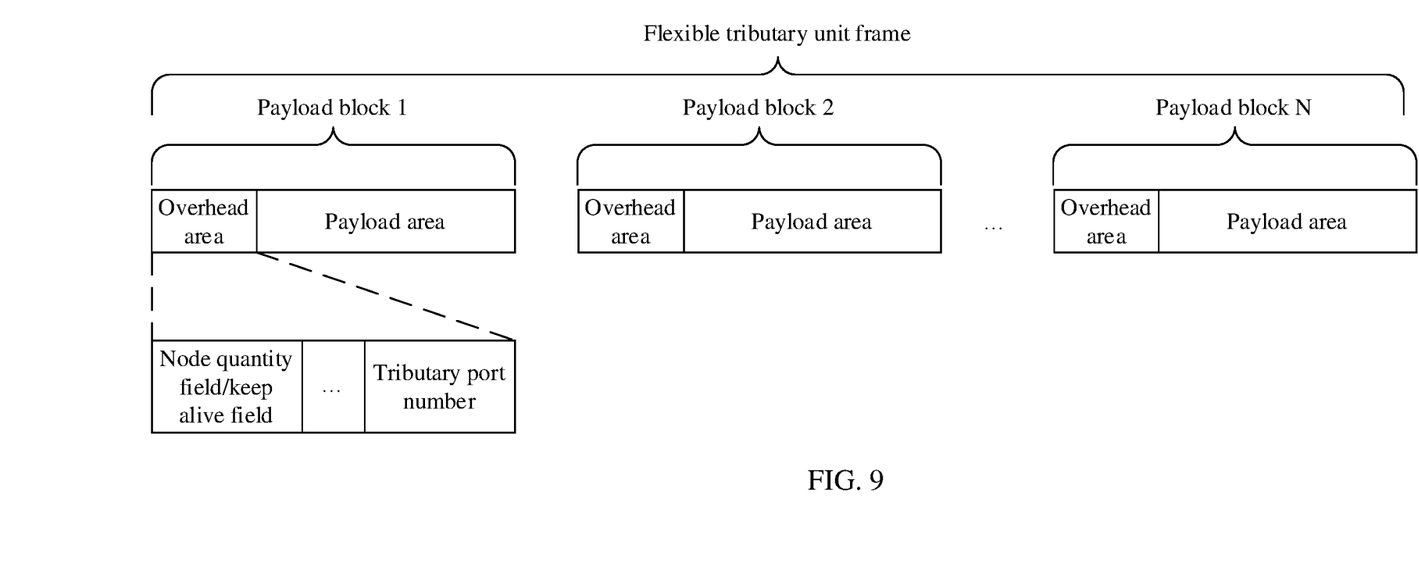
FIG. 9 is a schematic diagram of a structure of a TUflex frame.

FIG. 9 is a schematic diagram of a structure of a TUflex frame. The TUflex frame includes a plurality of payload blocks. Each payload block includes an overhead area and a payload area. The overhead area includes a tributary port number used to indicate a number of a service borne in the payload block.

In a possible implementation, a part of bits in an overhead area of at least one payload block are allocated as a node quantity field and/or a keep alive field. Optionally, the keep alive field and another overhead field in the overhead area may be a same field. When a bit in the overhead area is a specific value, the field represents the keep alive field. Otherwise, the field represents another overhead field. For example, when all bits in the overhead area are "0" or "1", the field represents the keep alive field. For another example, when bits in the overhead area are arranged in a specific manner such as "0101" or "1010", the field represents the keep alive field.

In another possible implementation, the payload area of each payload block of the TUflex frame does not bear service data. For a specific application scenario, refer to step 501 in the foregoing embodiment shown in FIG. 5. Details are not described herein again. Based on the scenario, a part of bits in a payload area of at least one payload block may be allocated to as a keep alive field.

In still another possible implementation, there may be at least one dedicated payload block in the plurality of payload blocks of the TUflex frame. A TPN of the dedicated payload block is set to a dedicated value, and is different from a common payload block. A part of bits in a payload area of the at least one dedicated payload block may be allocated as a node quantity field and/or a keep alive field.

It should be noted that, in addition to the listed several structures of the signal frame, the node quantity field and/or the keep alive field may be set in an overhead area of an OPUk frame, an overhead area of an ODUk frame, an overhead area of an OTUk frame, or the like. This is not specifically limited herein.

The foregoing describes the signal frame processing method provided in this application. The following describes an optical transport device provided in this application.

Figure 10:
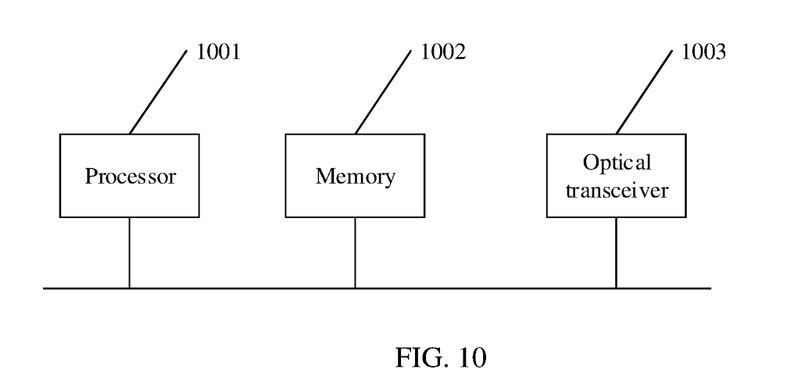
FIG. 10 is a schematic diagram of a possible structure of an optical transport device.

FIG. 10 is a schematic diagram of a possible structure of an optical transport device. The optical transport device includes a processor 1001, a memory 1002, and an optical transceiver 1003. The processor 1001, the memory 1002, and the optical transceiver 1003 are connected to each other by using a line. The memory 1002 is configured to store program instructions and data. It should be noted that the optical transport device may be the foregoing source node. Alternatively, the optical transport device may be the foregoing intermediate node. Alternatively, the optical transport device may be the foregoing sink node.

It should be noted that the optical transceiver 1003 is configured to perform a signal frame sending/receiving operation in the steps shown in FIG. 4, FIG. 5, or FIG. 6. The processor 1001 is configured to perform an operation other than the signal frame sending/receiving operation in the steps shown in FIG. 4, FIG. 5, or FIG. 6. The following separately describes several different implementations of the optical transport device.

In a possible implementation, if the optical transport device is used as the foregoing source node, the memory 1002 stores program instructions and data that are executed by the source node and that are in the steps shown in FIG. 4 or FIG. 5. The processor 1001 and the optical transceiver 1003 are configured to perform steps of the method in any one of embodiments in FIG. 4 or FIG. 5. For example, the optical transceiver 1003 is configured to perform step 401 and step 403. The processor 1001 is configured to perform step 402.

In another possible implementation, if the optical transport device is used as the foregoing intermediate node, the memory 1002 stores program instructions and data that are executed by the intermediate node and that are in the steps shown in FIG. 4, FIG. 5, or FIG. 6. The processor 1001 and the optical transceiver 1003 are configured to perform steps of the method in any one of embodiments in FIG. 4, FIG. 5, or FIG. 6. For example, the optical transceiver 1003 is configured to perform step 405. The processor 1001 is configured to perform step 404.

In still another possible implementation, if the optical transport device is used as the foregoing sink node, the memory 1002 stores program instructions and data that are executed by the sink node and that are in the steps shown in FIG. 4, FIG. 5, or FIG. 6. The processor 1001 and the optical transceiver 1003 are configured to perform steps of the method in any one of embodiments in FIG. 4, FIG. 5, or FIG. 6. For example, the processor 1001 is configured to perform step 406.

An embodiment of this application further provides a digital processing chip. The digital processing chip is integrated with a circuit configured to implement the function of the processor 1001 and one or more interfaces. When the digital processing chip is integrated with a memory, the digital processing chip may complete steps of the method in any one or more embodiments in the foregoing embodiments. When the digital processing chip is integrated with no memory, the digital processing chip may be connected to an external memory by using an interface. The digital processing chip implements, based on program code stored in the external memory, an action executed by the optical transport device in the foregoing embodiments.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   receiving a signal frame, wherein a payload area of the signal frame bears a target service, and an overhead area of the signal frame comprises a node quantity field, the node quantity field comprising information indicating a quantity of nodes through which the target service has passed during transmission of the target service;
   determining, based on the node quantity field, the quantity of nodes; and
   performing delay compensation on the target service based on the quantity of nodes; and
   wherein the signal frame is an optical service unit frame, the optical service unit frame comprises an overhead subframe and a data subframe, the data subframe bears the target service, and the overhead subframe comprises the node quantity field; or
   wherein the signal frame is a flexible tributary unit frame, and the flexible tributary unit frame comprises a plurality of payload blocks, and an overhead area of at least one payload block in the plurality of payload blocks comprises the node quantity field.

2. The method according to claim 1, wherein the overhead area of the signal frame further comprises a keep alive field, the keep alive field indicating that the target service is in an active state, and the method further comprises:
   determining, based on the keep alive field, that the target service is in the active state.

3. The method according to claim 2, wherein before performing the delay compensation on the target service based on the quantity of nodes, the method further comprises:
   receiving configuration information sent by a network management device, wherein the configuration information indicates the quantity of nodes through which the target service has passed during transmission.

4. The method according to claim 1, wherein the method further comprises:
   recovering a clock of the target service based on the quantity of nodes.

5. The method according to claim 1, further comprising:
   mapping the optical service unit frame to a payload block of an optical payload unit k (OPUk) frame.

6. The method according to claim 1, wherein a sink node reserves a buffer based on the quantity of nodes.

7. A method comprising:
receiving a first signal frame, wherein a payload area of the first signal frame bears a target service, and an overhead area of the first signal frame comprises a node quantity field, the node quantity field indicating a first quantity of nodes through which the target service has passed during transmission of the target service;
determining, based on the node quantity field, the first quantity of nodes;
increasing the first quantity by 1 to obtain a second quantity, and updating the node quantity field of the first signal frame based on the second quantity; and
sending the first signal frame having the updated node quantity field; and
wherein the first signal frame is an optical service unit frame, the optical service unit frame comprises an overhead subframe and a data subframe, the data subframe bears the target service, and the overhead subframe comprises the node quantity field; or
wherein the first signal frame is a flexible tributary unit frame, and the flexible tributary unit frame comprises a plurality of payload blocks, and an overhead area of at least one payload block in the plurality of payload blocks comprises the node quantity field.

8. The method according to claim 7, wherein the overhead area of the first signal frame further comprises a keep alive field, the keep alive field indicating that the target service is in an active state, and the method further comprises:
determining, based on the keep alive field, that the target service is in the active state.

9. The method according to claim 7, wherein the method further comprises:
when the target service is not received in a target cycle, generating a second signal frame, wherein an overhead area of the second signal frame comprises a keep alive field, and the keep alive field indicates that the target service is in an active state; and
sending the second signal frame.

10. The method according to claim 7, further comprising:
when a keep alive indication of the target service is not received in a target cycle, generating a second signal frame, wherein an overhead area of the second signal frame comprises a keep alive field, and the keep alive field indicates that the target service is in an active state; and
sending the second signal frame.

11. The method according to claim 7, further comprising:
mapping the optical service unit frame to a payload block of an optical payload unit k (OPUk) frame.

12. The method according to claim 7, wherein a sink node reserves a buffer based on the quantity of nodes.

13. The method according to claim 12, wherein a size of the reserved buffer is at least as big as a size of a payload block multiplied by the quantity of nodes.

14. An optical transport system, comprising a source node, an intermediate node, and a sink node, wherein
the source node is configured to:
receive a target service;
map the target service to a first signal frame, wherein a payload area of the first signal frame bears the target service, an overhead area of the first signal frame comprises a node quantity field, the node quantity field indicating a quantity of nodes through which the target service has passed during transmission of the target service, and set a value of the quantity to 1; and
send the first signal frame;
the intermediate node is configured to:
receive the first signal frame;
determine, based on the node quantity field, a first quantity of nodes through which the target service has passed during transmission;
increase the first quantity by 1 to obtain a second quantity, and update the node quantity field of the first signal frame based on the second quantity; and
send the first signal frame having the updated node quantity field; and
the sink node is configured to:
receive the first signal frame having the updated node quantity field;
determine the second quantity based on the node quantity field; and
perform delay compensation on the target service based on the second quantity; and
wherein the first signal frame is an optical service unit frame, the optical service unit frame comprises an overhead subframe and a data subframe, the data subframe bears the target service, and the overhead subframe comprises the node quantity field; or
wherein the first signal frame is a flexible tributary unit frame, and the flexible tributary unit frame comprises a plurality of payload blocks, and an overhead area of at least one payload block in the plurality of payload blocks comprises the node quantity field.

15. The optical transport system according to claim 14, wherein when the source node does not receive the target service in a target cycle,
the source node is further configured to:
generate a second signal frame, wherein an overhead area of the second signal frame comprises a keep alive field, the keep alive field indicating that the target service is in an active state; and
send the second signal frame;
the intermediate node is further configured to:
determine, based on the keep alive field, that the target service is in the active state; and
send the second signal frame; and
the sink node is further configured to:
determine, based on the keep alive field, that the target service is in the active state.

16. The optical transport system according to claim 14, wherein the sink node is further configured to:
recover a clock of the target service based on the quantity of nodes.

17. A method comprising:
receiving a signal frame, wherein a payload area of the signal frame bears a target service, and an overhead area of the signal frame comprises a keep alive field, the keep alive field indicating that the target service is in an active state; and
determining, based on the keep alive field, that the target service is in the active state; and
wherein the signal frame is an optical service unit frame, the optical service unit frame comprises an overhead subframe and a data subframe, the data subframe bears the target service, and the overhead subframe comprises the keep alive field; or
wherein the signal frame is a flexible tributary unit frame, and the flexible tributary unit frame comprises a plurality of payload blocks, and an overhead area of at least one payload block in the plurality of payload blocks comprises the keep alive field.

18. The method according to claim 17, wherein a sink node reserves a transmission bandwidth for the target service based on the keep alive field.

19. The method according to claim 17, wherein the overhead area of the signal frame further comprises management and monitoring information of the target service.

20. The method according to claim 17, wherein the overhead area of the signal frame further comprises a node quantity field.

* * * * *